(12) United States Patent
Wang

(10) Patent No.: US 6,524,188 B2
(45) Date of Patent: Feb. 25, 2003

(54) GAME CONTROLLER WITH A MONITOR

(76) Inventor: Yung-Chung Wang, 3F, No. 651, Chung-Cheng Rd., Hsin-Chuang City, Taipei Hsien (TW)

( * ) Notice: Subject to any disclaimer, the term of this patent is extended or adjusted under 35 U.S.C. 154(b) by 15 days.

(21) Appl. No.: 09/892,146

(22) Filed: Jun. 26, 2001

(65) Prior Publication Data

US 2002/0198048 A1 Dec. 26, 2002

(51) Int. Cl.[7] .............................. A63F 13/00; A63F 9/24
(52) U.S. Cl. ......................................... 463/37; 345/168
(58) Field of Search .............................. 463/35, 36, 37, 463/38; 341/20, 22; 345/156, 168, 169

(56) References Cited

U.S. PATENT DOCUMENTS

| | | | | |
|---|---|---|---|---|
| 4,969,647 A | * | 11/1990 | Mical et al. .............. 273/85 G |
| RE35,786 E | * | 5/1998 | Ohara .......................... 463/44 |
| 5,795,227 A | * | 8/1998 | Raviv et al. .................. 463/34 |
| 5,874,906 A | * | 2/1999 | Willner et al. ................ 341/22 |
| 6,287,560 B1 | * | 9/2001 | Fujii .......................... 424/127 |
| 6,394,906 B1 | * | 5/2002 | Ogata .......................... 463/38 |
| 2002/0049088 A1 | * | 4/2002 | Fields .......................... 463/43 |

* cited by examiner

Primary Examiner—Denise L. Esquivel
Assistant Examiner—Marc Norman
(74) Attorney, Agent, or Firm—William E. Pelton, Esq.

(57) ABSTRACT

A game controller has a pad having two sets of buttons provided thereon and a control unit assembled therein. A monitor is pivotally mounted on the pad. A sounder is assembled inside the pad. The buttons, the monitor and the sounder are electrically connected with a game host via the control unit and an interface. Whereby, the monitor displays a game video and a user can play video games without a TV set.

10 Claims, 4 Drawing Sheets

GAME CONTROLLER WITH A MONITOR

BACKGROUND OF THE MENTION

1. Field of the Invention

The present invention is related to a game controller for a video game, and more particularly to a game controller with a monitor.

2. Description of Related Art

Video games have become enormously popular in recent years, especially with young people. Playing a video game needs a TV set to be connected with a game host and so if a family has only one TV set, inconvenience may arise if one family member wants to watch a TV show and another member wants to play the video game. Furthermore, it is suspected that if a viewer sits too close to a TV screen for long periods of time, as is often the case with game players, that viewer may be exposed to harmful radiation. Therefore, the invention provides a game controller with a monitor to mitigate and/or obviate the aforementioned problem.

SUMMARY OF THE INVENTION

The main objective of the invention is to provide a game controller which can display output video transmission from a game host for playing video games without a TV set.

A further objective is to provide a game controller with a low-radiation LCD monitor.

Other objects, advantages and novel features of the invention will become more apparent from the following detailed description when taken in conjunction with the accompanying drawings.

DESCRIPTION OF THE PREFERRED EMBODIMENT

Figure 1:
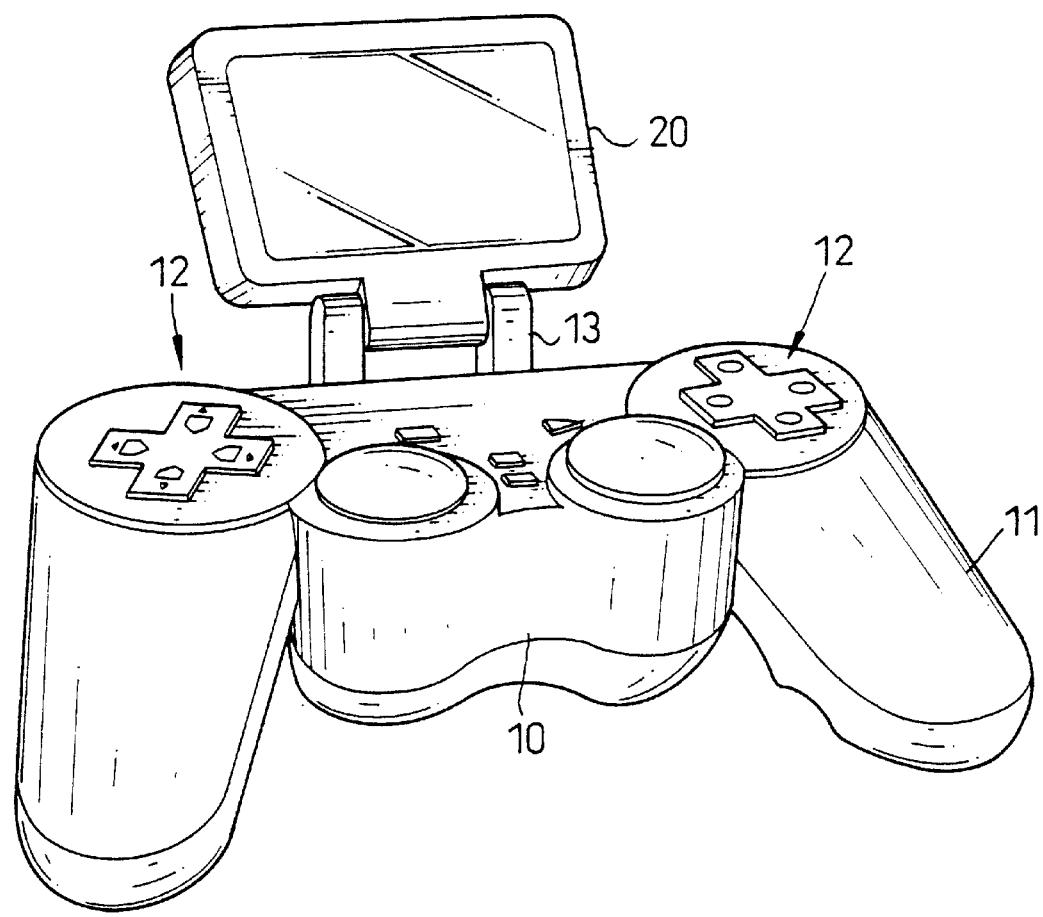
FIG. 1 is a perspective view of a game controller in accordance with the invention.

Referring to FIG. 1, a game controller in accordance with the present invention is composed of a pad (10), a monitor (20) pivotally mounted on the pad (10), and a sounder (not shown in this figure) assembled inside the pad (10).

The pad (10) has two grips (11) respectively formed at two sides of the pad (10). Two sets of buttons (12) are respectively provided on the grips (11). A user can hold the grips (11) and press the buttons (12) to play a game.

A U-like pivot seat (13) is formed at a front side of the pad (10) and between the grips (11). The monitor (20), in the embodiment being an LCD monitor, is pivotally mounted on the pivot seat (13).

Figure 2:
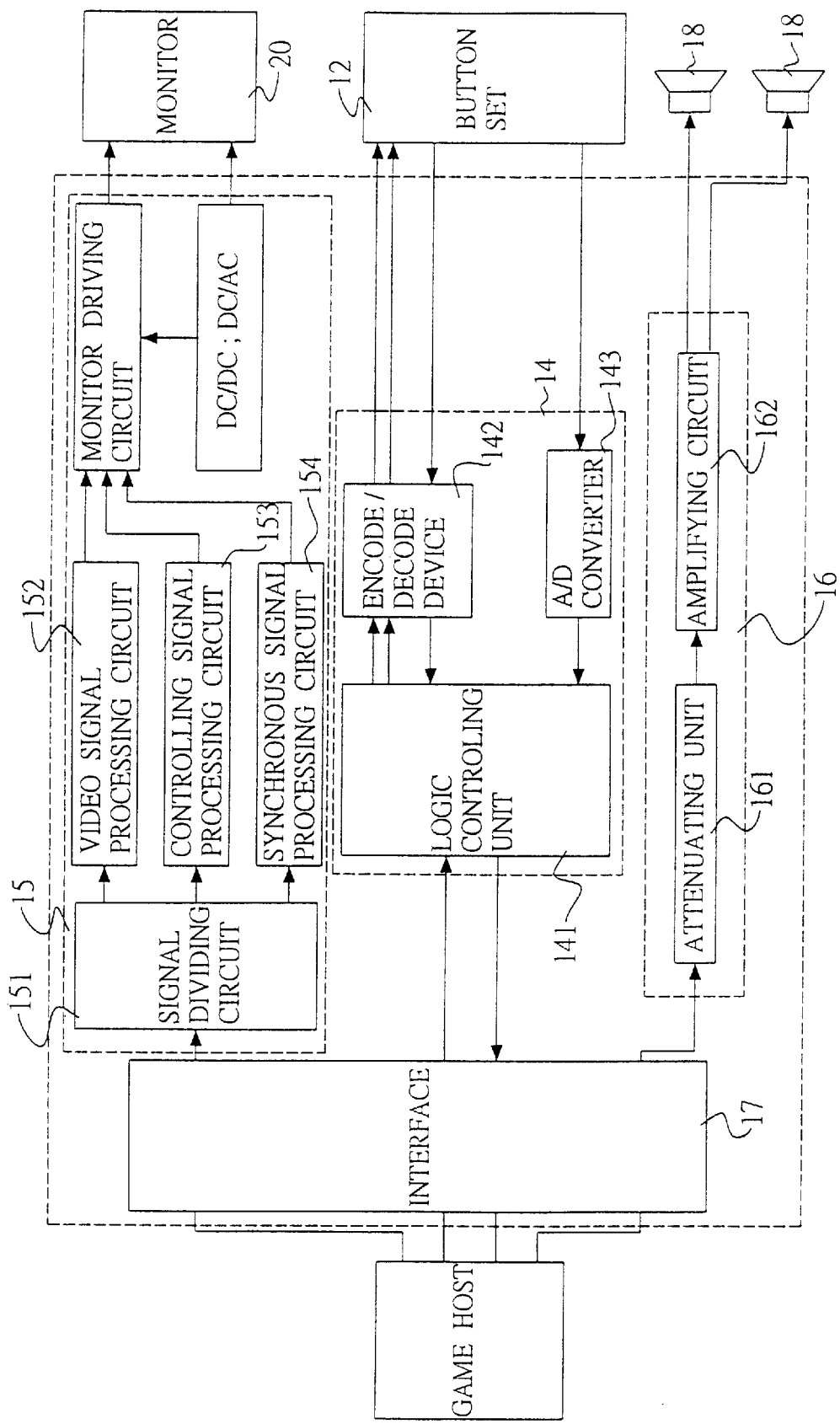
FIG. 2 is a diagram of an electric circuit of the game controller.

Referring to FIG. 2, a control unit is provided in the pad (10) and includes a controlling circuit (14), a video processing circuit (15), and an audio processing circuit (16) in parallel connected with a game host (not numbered) via an interface (17).

The controlling circuit (14) has a logic controlling unit (141) connected with the game host. An encode/decode device (142) and an A/D converter (143) are connected in parallel with the logic controlling unit (141). The sets of buttons (12) are connected to output ends of the encode/decode device (142) and the A/D converter (143).

The video processing circuit (15) has a signal dividing circuit (151) to divide input signals to video signals, controlling signals and synchronous signals. A video signal processing circuit (152), a controlling signal processing circuit (153) and a synchronous signal processing circuit (154) are connected in parallel with an output end of the signal dividing circuit (151) and respectively used for processing video signals, controlling signals and synchronous signals from the signal dividing circuit (151). A monitor driving circuit (155) is connected with respective output ends of the video signal processing circuit (152), the controlling signal processing circuit (153) and the synchronous signal processing circuit (154). The monitor (20) is connected with an output end of the monitor driving circuit (155).

The audio processing circuit (16) has an attenuating unit (161) and an amplifying circuit (162) connected in series. An input end of the attenuating unit (161) is connected to the host via the interface (17), and an output end of the amplifying circuit (162) is connected to two speakers (18) to output stereo sound.

The interface (17) includes AV input ports for connecting the game controller with the host.

Figure 3:
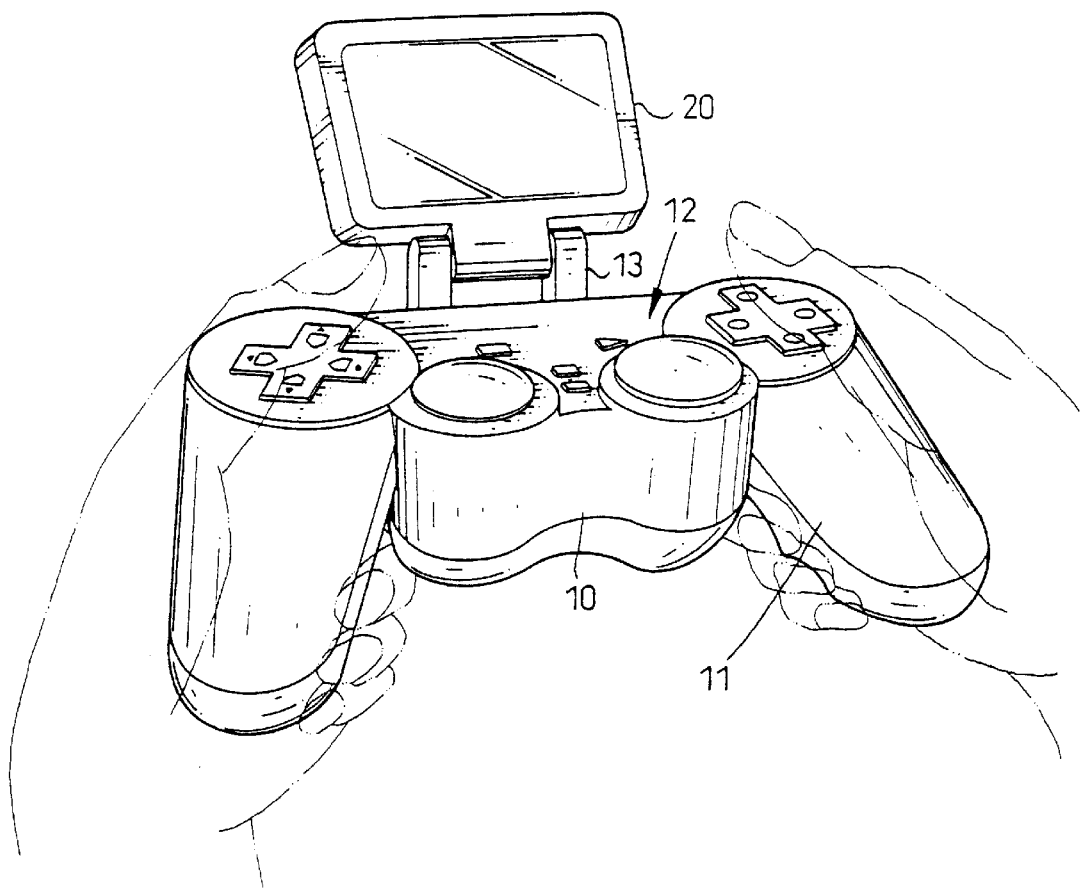
FIG. 3 is a schematic view showing that the game controller is hand-held by a user.

According to the present invention, the monitor (20) and the sounder combined as an AV device are integrated with the pad (10) of the game controller, whereby, the game host need not be connected with a TV set. A game player can directly watch the monitor (20) while holding the grips (11) to control the game, as shown in FIG. 3.

Furthermore, because the game controller has the AV input ports provided on the interface (17), the monitor (20) is able to display digital AV programs from an external item of equipment such as a VCD or DVD player.

Figure 4:
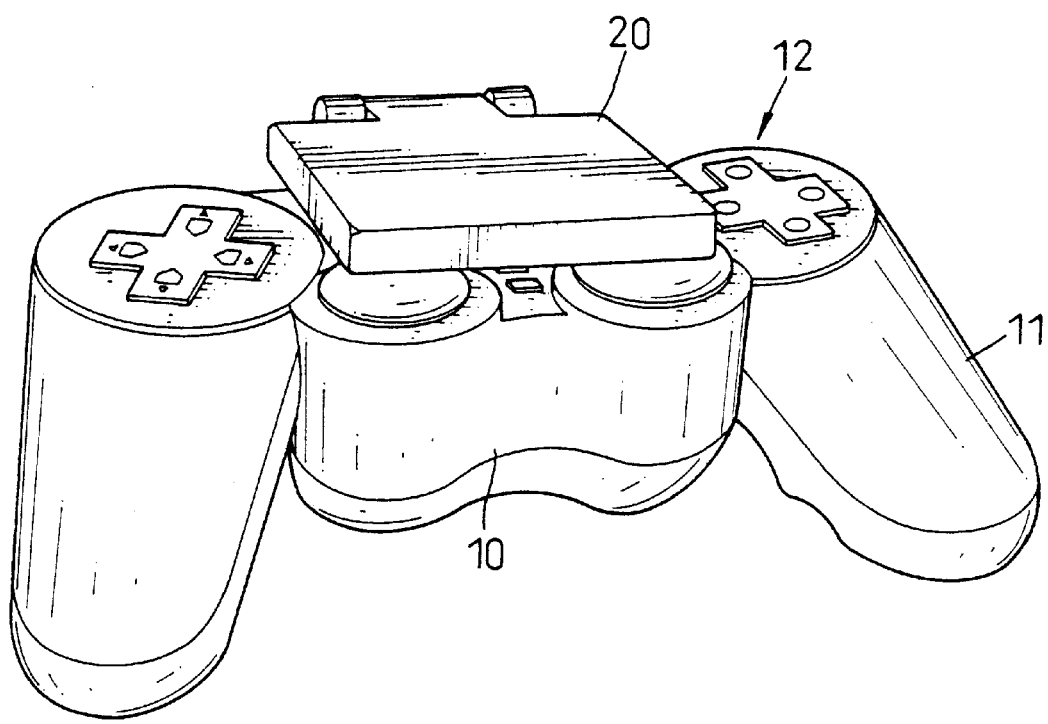
FIG. 4 is a schematic view showing that a monitor is folded for storing the game controller.

For convenient storage, the monitor (20) is folded inwards to close the pad (10), as shown in FIG. 4, which reduces the size of the game controller, as well as protecting the viewing screen of the monitor (20).

The LCD monitor (20) may be a low-radiation type whereby the user is not exposed to possibly harmful radiation otherwise experienced by viewers close to a monitor or TV set.

From the above description, it is noted that the invention has the following advantages:

1. Because the game controller is integrated with the monitor (20), a user can play games at any location, even without a TV set.
2. Because the low-radiation LCD monitor is pivotally mounted on the pivot seat, it is not only safe for the user, but also is able to be easily adjusted by the user.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A game controller comprising:
   a pad (10) having two sets of buttons (12) provided thereon and a control unit assembled therein;

a monitor (20) pivotally mounted on the pad (10); and a sounder assembled inside the pad (10); wherein the buttons (12), the monitor (20) and the sounder are electrically connected with a game host via the control unit and an interface (17).

2. The game controller as claimed in claim 1, wherein the pad (10) has two grips (11) respectively formed at two sides of the pad (10) and adjacent to the sets of buttons (12).

3. The game controller as claimed in claim 1, wherein the pad (10) has a pivot seat (13) formed at a front side of the pad (10), and the monitor (20) is pivotally mounted on the pivot seat (13).

4. The game controller as claimed in claim 1, wherein the control unit is composed of a controlling circuit (14), a video processing circuit (15), and an audio processing circuit (16) connected with the game host in parallel via the interface (17).

5. The game controller as claimed in claim 4, wherein the controlling circuit (14) has an output end connected with the buttons (12).

6. The game controller as claimed in claim 4, wherein the video processing circuit (15) has an output end connected with the monitor (20).

7. The game controller as claimed in claim 4, wherein the audio processing circuit (16) has an output end connected with the sounder.

8. The game controller as claimed in claim 1, wherein the monitor is an LCD monitor.

9. The game controller as claimed in claim 8, wherein the LCD monitor is a low-radiation LCD monitor.

10. The game controller as claimed in claim 1, wherein the sounder is composed of at least two speakers (18).

* * * * *